United States Patent [19]

Shyu

[11] Patent Number: 5,990,876
[45] Date of Patent: *Nov. 23, 1999

[54] METHOD AND APPARATUS WITH REDUCED LOOK-UP TABLES FOR CONVERTING RGB COLOR SPACE SIGNALS TO YCBCR COLOR SPACE SIGNALS

[75] Inventor: Rong-Fuh Shyu, Hsinchu, Taiwan

[73] Assignee: Winbond Electronics Corp., Hsinchu, Taiwan

[*] Notice: This patent is subject to a terminal disclaimer.

[21] Appl. No.: 08/964,433

[22] Filed: Nov. 4, 1997

Related U.S. Application Data

[63] Continuation-in-part of application No. 08/763,539, Dec. 10, 1996, Pat. No. 5,841,422.

[51] Int. Cl.⁶ .................................................. G09G 5/06
[52] U.S. Cl. .................................... 345/199; 345/154
[58] Field of Search .................................... 345/153, 154, 345/199; 358/518, 520; 348/577, 557, 660

[56] References Cited

U.S. PATENT DOCUMENTS

| | | | |
|---|---|---|---|
| 4,507,676 | 3/1985 | Dischert et al. | 348/660 |
| 4,742,386 | 5/1988 | Wilkinson | 358/13 |
| 4,829,455 | 5/1989 | Long et al. | 364/521 |
| 4,835,599 | 5/1989 | Sigel | 358/30 |
| 5,124,688 | 6/1992 | Rumball | 345/199 |
| 5,262,847 | 11/1993 | Rodriguez et al. | 358/21 R |
| 5,504,821 | 4/1996 | Kanamori et al. | 382/167 |
| 5,510,852 | 4/1996 | Shyu | 348/660 |
| 5,541,658 | 7/1996 | Ishiwata | 348/394 |
| 5,798,753 | 8/1998 | Zhou et al. | 345/154 |
| 5,818,613 | 10/1998 | Masterson et al. | 358/520 |
| 5,821,919 | 10/1998 | Coelho | 345/154 |
| 5,841,422 | 11/1998 | Shyu | 345/154 |

*Primary Examiner*—Kee M. Tung
*Attorney, Agent, or Firm*—Christie, Parker & Hale, LLP

[57] ABSTRACT

In a method and apparatus for reducing the number of matrix operations when converting digitized RGB color space signals to digitized YCbCr color space signals, at least two color difference signals, each being in terms of any two of the digitized RGB color space signals, are generated before performing first, second, third and fourth matrix multiplication operations of the color difference signals. The first and second matrix multiplication operations have first and second results to be used in conversion for the digitized Y color space signal. The third matrix multiplication operation has a third result to be used in conversion for the digitized Cb color space signal. The fourth matrix multiplication operation has a fourth result to be used in conversion for the digitized Cr color space signal. One of the first and second matrix multiplication operations and one of the third and fourth matrix multiplication operations are associated with the same one of the color difference signals and are jointly implemented in a single look-up table unit.

16 Claims, 5 Drawing Sheets

METHOD AND APPARATUS WITH REDUCED LOOK-UP TABLES FOR CONVERTING RGB COLOR SPACE SIGNALS TO YCBCR COLOR SPACE SIGNALS

CROSS-REFERENCE TO RELATED APPLICATION

This application is a continuation-in-part (CIP) of U.S. patent application Ser. No. 08/763,539, entitled "Method and Apparatus For Reducing Number of Matrix Operations When Converting RGB Color Space Signals to YCbCr Color Space Signals," and filed on Dec. 10, 1996, now U.S. Pat. No. 5,841,422 the entire disclosure of which is incorporated herein by reference.

BACKGROUND OF THE INVENTION

1. Field of the Invention

The invention relates to a method and apparatus for performing color space conversion, more particularly to a method and apparatus with reduced look-up tables for converting digitized RGB color space signals to digitized YCbCr color space signals.

2. Description of the Related Art

Because signals in the Y (luminance), Cb and Cr (chrominance) color space have the advantage of being readily compressible to result in a lower transmission bandwidth and in a lower data storage requirement over signals in the R (red), G (green) and B (blue) color space, color space conversion from RGB to YCbCr is frequently desired in image and video applications. CCIR 601, which was proposed by the Comite Consultalif International des Radiocommunications (CCIR) establishes the following formulas for converting from the RGB color space to the YCbCr color space:

$$Y=0.299R+0.587G+0.114B \tag{a.1}$$

$$Cb=0.564(B-Y)+128 \tag{a.2}$$

$$Cr=0.713(R-Y)+128 \tag{a.3}$$

Color space conversion is often implemented by employing multipliers or look-up tables to achieve the matrix multiplication operations, and by combining the resultant component products to complete the conversion. The matrix multiplication operations dominate the operating efficiency and the hardware complexity of a color space converting apparatus. Therefore, the number of matrix multiplication operations is crucial. A 3-by-3 multiplication matrix is typically used for converting between any two color spaces of three color components. Although such a multiplication matrix offers flexibility, it is relatively expensive to implement.

To perform the RGB to YCbCr color space conversion of Equations (a.1) to (a.3), a conventional color space converter needs to first perform three matrix multiplication operations to obtain the Y color signal, and then derive the (B-Y) and (R-Y) color difference signals before performing two more matrix multiplication operations to obtain the Cb and Cr color signals, respectively. Although the color space converter requires only five matrix multiplication operations that involve relatively simple hardware, the operating efficiency of the color space converter is relatively poor since the matrix multiplication operations are done in two operating stages.

In order to improve the operating efficiency of the conventional color space converter, Equations (a.2) and (a.3) can be expanded so that the Cb and Cr color signals are entirely in terms of the R, G and B color signals:

$$Cb=-0.169R-0.331G+0.5B+128 \tag{b.1}$$

$$Cr=0.5R-0.419G-0.081B+128 \tag{b.2}$$

However, implementation of Equations (a.1), (b.1) and (b.2) requires nine matrix multiplication operations. Although the number of matrix multiplication operations can be reduced to seven by using an arithmetic right-shift operation to implement the two component products that have a coefficient of 0.5, the number of matrix multiplication operations is still more than that required in the implementation of Equations (a.1) to (a.3).

In co-pending U.S. patent application Ser. No. 08/763, 539, entitled "Method and Apparatus For Reducing Number of Matrix Operations When Converting RGB Color Space Signals to YCbCr Color Space Signals," and filed on Dec. 10, 1996 by the Applicant, it has been proposed that, by using the characteristics of mutual complement between the coefficients of color component signals, the conversion formula for the Y color signal be rearranged as follows by constructing two color difference signals in terms of any two of the R, G and B color signals in order to reduce the required number of matrix multiplication operations from three to two:

$$Y=R+0.587(G-R)+0.114(B-R) \tag{c.1}$$

$$Y=G+0.299(R-G)+0.114(B-G) \tag{c.2}$$

$$Y=B+0.299(R-B)+0.587(G-B) \tag{c.3}$$

The Cb and Cr conversion formulas can be similarly rewritten in the same manner as follows so as to require only one matrix multiplication operation and one arithmetic right-shift operation:

$$Cb=0.5(B-G)-0.169(R-G)+128 \tag{d.1}$$

$$Cb=0.5(B-R)+0.331(R-G)+128 \tag{d.2}$$

$$Cb=0.5[(B-G)-0.338(R-G)]+128 \tag{d.3}$$

$$Cb=0.5[(B-R)+0.662(R-G)]+128 \tag{d.4}$$

$$Cr=0.5(R-G)-0.081(B-G)+128 \tag{e.1}$$

$$Cr=0.5(R-B)+0.419(B-G)+128 \tag{e.2}$$

$$Cr=0.5[(R-G)-0.162(B-G)]+128 \tag{e.3}$$

$$Cr=0.5[(R-B)+0.838(B-G)]+128 \tag{e.4}$$

The above equations present a lot of possible arrangements for converting to YCbCr color space signals. However, other unlisted possible alternatives must be available.

In the aforementioned U.S. patent application, by generating a set of color difference signals in terms of the R, G and B color signals, and by selecting appropriate Y, Cb and Cr conversion formulas, RGB to YCbCr color space conversion can be implemented using only four matrix multiplication operations in a single operating stage, thereby realizing a relatively inexpensive and highly efficient color space converting method and apparatus.

The apparatus disclosed in the aforementioned U.S. patent application comprises means for generating at least two color difference signals, each being in terms of any two of the digitized RGB color space signals, and means for performing first, second, third and fourth matrix multiplication operations of the color difference signals, the first and second matrix multiplication operation performing means having first and second results to be used in conversion for the digitized Y color space signal, the third matrix multiplication operation performing means having a third result to be used in conversion for the digitized Cb color space signal, the fourth matrix multiplication operation performing means having a fourth result to be used in conversion for the digitized Cr color space signal.

While each of the first, second, third and fourth matrix multiplication operations of the embodiments disclosed in the aforementioned U.S. patent application is implemented as a single look-up table to result in a simplified circuit design, it is desirable to further reduce the number and sizes of the look-up tables used therein so that a cost-effective hardware implementation can be achieved while maintaining a high operating efficiency.

SUMMARY OF THE INVENTION

Therefore, the main object of the present invention is to provide a color space converting method and apparatus which employs a smaller number of look-up table units to implement the matrix multiplication operations when converting digitized RGB color space signals to digitized YCbCr color space signals.

More specifically, the object of the present invention is to provide a color space converting method and apparatus in which plural matrix multiplication operations that are associated with the same color difference signal are jointly implemented using a single look-up table unit to result in a smaller number of look-up table units for converting digitized RGB color space signals to digitized YCbCr color space signals.

Another object of the present invention is to provide a color space converting method and apparatus which employs coded look-up table units of reduced sizes to implement the matrix multiplication operations when converting digitized RGB color space signals to digitized YCbCr color space signals.

According to one aspect of the present invention, in a method for converting digitized RGB color space signals to digitized YCbCr color space signals, at least two color difference signals are generated, each being in terms of any two of the digitized RGB color space signals. First, second, third and fourth matrix multiplication operations of the color difference signals are then performed. The first and second matrix multiplication operations have first and second results to be used in conversion for the digitized Y color space signal. The third matrix multiplication operation has a third result to be used in conversion for the digitized Cb color space signal. The fourth matrix multiplication operation has a fourth result to be used in conversion for the digitized Cr color space signal. One of the first and second matrix multiplication operations and one of the third and fourth matrix multiplication operations are associated with the same one of the color difference signals and are jointly implemented in a single look-up table unit.

According to another aspect of the present invention, an apparatus for converting digitized RGB color space signals to digitized YCbCr color space signals comprises means for generating at least two color difference signals, each being in terms of any two of the digitized RGB color space signals, and means for performing first, second, third and fourth matrix multiplication operations of the color difference signals. The first and second matrix multiplication operation performing means have first and second results to be used in conversion for the digitized Y color space signal. The third matrix multiplication operation performing means has a third result to be used in conversion for the digitized Cb color space signal. The fourth matrix multiplication operation performing means has a fourth result to be used in conversion for the digitized Cr color space signal. One of the first and second matrix multiplication operations performed by one of the first and second matrix multiplication operation performing means, and one of the third and fourth matrix multiplication operations performed by one of the third and fourth matrix multiplication operation performing means are associated with the same one of the color difference signals. Said one of the first and second matrix multiplication operation performing means and said one of the third and fourth matrix multiplication operation performing means are jointly implemented in a single look-up table unit.

Preferably, the look-up table unit has first and second outputs, and outputs a corresponding codeword that contains a first transformation code corresponding to the results of said one of the first and second matrix multiplication operation performing means at the first output, and a second transformation code corresponding to the results of said one of the third and fourth matrix multiplication operation performing means at the second output when the look-up table unit is addressed by the same one of the color difference signals.

In one embodiment, the look-up table unit includes a first data field which contains the first transformation codes, and a second data field which contains the second transformation codes.

In another embodiment, the look-up table unit includes a look-up table portion which has an average data field and an error data field. The average data field contains average conversion codes which are average codes of the first and second transformation codes. The error data field contains error conversion codes which correspond to differences between the average conversion codes and corresponding ones of the first and second transformation codes. The look-up table portion outputs one of the average conversion codes and the corresponding one of the error conversion codes when addressed by the same one of the color difference signals. First combining means, such as an adder, combines an outputted one of the average conversion codes and the corresponding one of the error conversion codes to generate the corresponding one of the first transformation codes at the first output. Second combining means, such as a subtracter, combines the outputted one of the average conversion codes and the corresponding one of the error conversion codes to generate the corresponding one of the second transformation codes at the second output.

Preferably, the color space converting apparatus further comprises means for performing arithmetic right-shift operations of the color difference signals to obtain a plurality of binary conversion codes of the color difference signals having coefficients of powers of ½. A first set of the binary conversion codes, the first and second results of the first and second matrix multiplication operation performing means, and one of the digitized RGB color space signals are combined to obtain a resultant sum, and the resultant sum is clipped to between a range that represents binary code of the Y color space signal. A second set of the binary conversion codes, the third result of the third matrix multiplication operation performing means, and a first constant are combined to obtain a first compensated result, and the first compensated result is clipped to between a range that represents binary code of the Cb color space signal. A third set of the binary conversion codes, the fourth result of the fourth matrix multiplication operation performing means, and a second constant are combined to obtain a second compensated result, and the second compensated result is clipped to between a range that represents binary code of the Cr color space signal.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
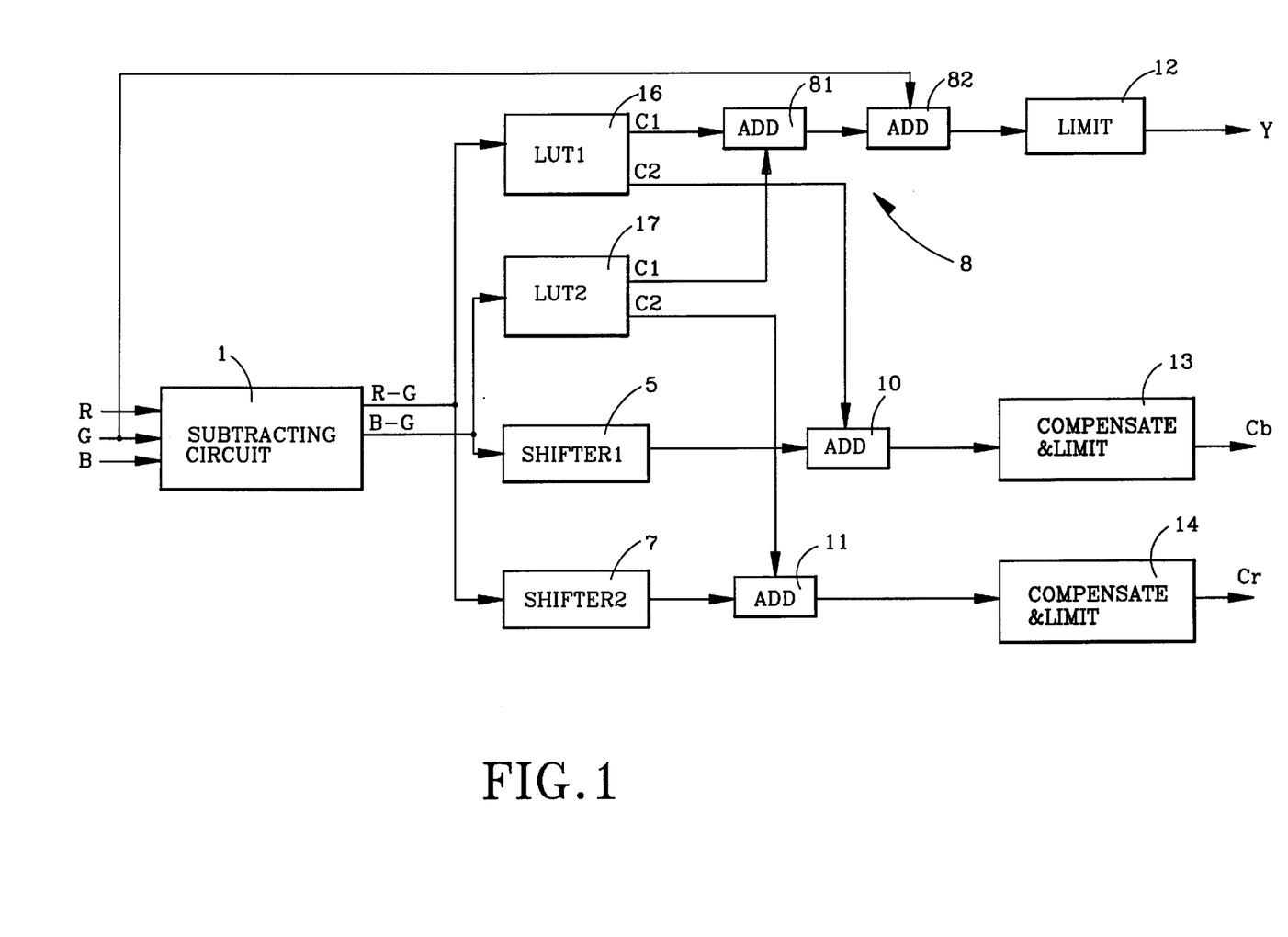
FIG. 1 is a schematic circuit block diagram of the first preferred embodiment of a color space converting apparatus according to the present invention.

The first preferred embodiment of a color space converting apparatus for converting digitized RGB color space signals to digitized YCbCr color space signals in accordance with this invention is shown in FIG. 1. Unlike the embodiments of the color space converting apparatus disclosed in the aforementioned U.S. patent application, which employ four look-up table units to perform four matrix multiplication operations, the first preferred embodiment employs only two look-up table units, each of which performs two matrix multiplication operations that are associated with the same corresponding color difference signal. As shown in FIG. 1, the first preferred embodiment comprises a subtracting circuit 1, first and second look-up table units 16 and 17, first and second arithmetic right-shift units 5 and 7, first to third combining units 8, 10 and 11, a limit circuit 12, and first and second compensate-and-limit circuits 13 and 14. In this embodiment, color space conversion is performed according to the following equations:

$$Y = G + 0.299(R-G) + 0.114(B-G) \quad \text{(c.2)}$$

$$Cb = 0.5(B-G) - 0.169(R-G) + 128 \quad \text{(d.1)}$$

$$Cr = 0.5(R-G) - 0.081(B-G) + 128 \quad \text{(e.1)}$$

The subtracting circuit 1 receives the digitized R, G and B color signals and generates (R-G) and (B-G) color difference signals therefrom. The color difference signals are directed to the first and second look-up table units 16 and 17. The first look-up table unit 16 contains transformation codes for performing the matrix multiplications which are associated with the (R-G) color difference signal, namely 0.299 (R-G) and −0.169(R-G). The second look-up table unit 17 contains transformation codes for performing the matrix multiplications which are associated with the (B-G) color difference signal, namely 0.114(B-G) and −0.081(B-G).

Therefore, when compared with the first and second embodiments disclosed in the aforementioned U.S. patent application, two of the four look-up table units thereof are concatenated to the first look-up table unit 16, while the remaining two are concatenated to the second look-up table unit 17.

The first look-up table unit 16 has a first output (C1) for providing the 0.299(R-G) transformation codes, and a second output (C2) for providing the −0.169(R-G) transformation codes. The second look-up table unit 17 has a first output (C1) for providing the 0.114(B-G) transformation codes, and a second output (C2) for providing the −0.081 (B-G) transformation codes. The first outputs (C1) of the first and second look-up table units 16 and 17 correspond to two of the three partial components of the Y color space signal.

The first combining unit 8 comprises a first adder 81 for adding the first outputs (C1) of the first and second look-up table units 16 and 17, and a second adder 82 for adding the output of the first adder 81 to the digitized G color space signal. The output of the second adder 82 is clipped by the limit circuit 12 so that the resultant sum is within a range that represents the binary code of the Y color space signal.

The color difference signals are further directed to the first and second arithmetic right-shift units 5 and 7 for performing the matrix multiplications of 0.5(B-G) and 0.5(R-G), respectively. The second output (C2) of the first look-up table unit 16 and the output of the first arithmetic right-shift unit 5 correspond to two partial components of the Cb color space signal. The second combining unit 10 includes an adder for adding the second output (C2) of the first look-up table unit 16 and the output of the first arithmetic right-shift unit 5. The first compensate-and-limit circuit 13 compensates the constant value of 128 to the output of the second combining unit 10, and clips the resultant sum so as to be within a range that represents the binary code of the Cb color space signal. The second output (C2) of the second look-up table unit 17 and the output of the second arithmetic right-shift unit 7 correspond to two partial components of the Cr color space signal. The third combining unit 11 includes an adder for adding the second output (C2) of the second look-up table unit 17 and the output of the second arithmetic right-shift unit 7. The second compensate-and-limit circuit 14 compensates the constant value of 128 to the output of the third combining unit 11, and clips the resultant sum so as to be within a range that represents the binary code of the Cr color space signal.

Figure 2:
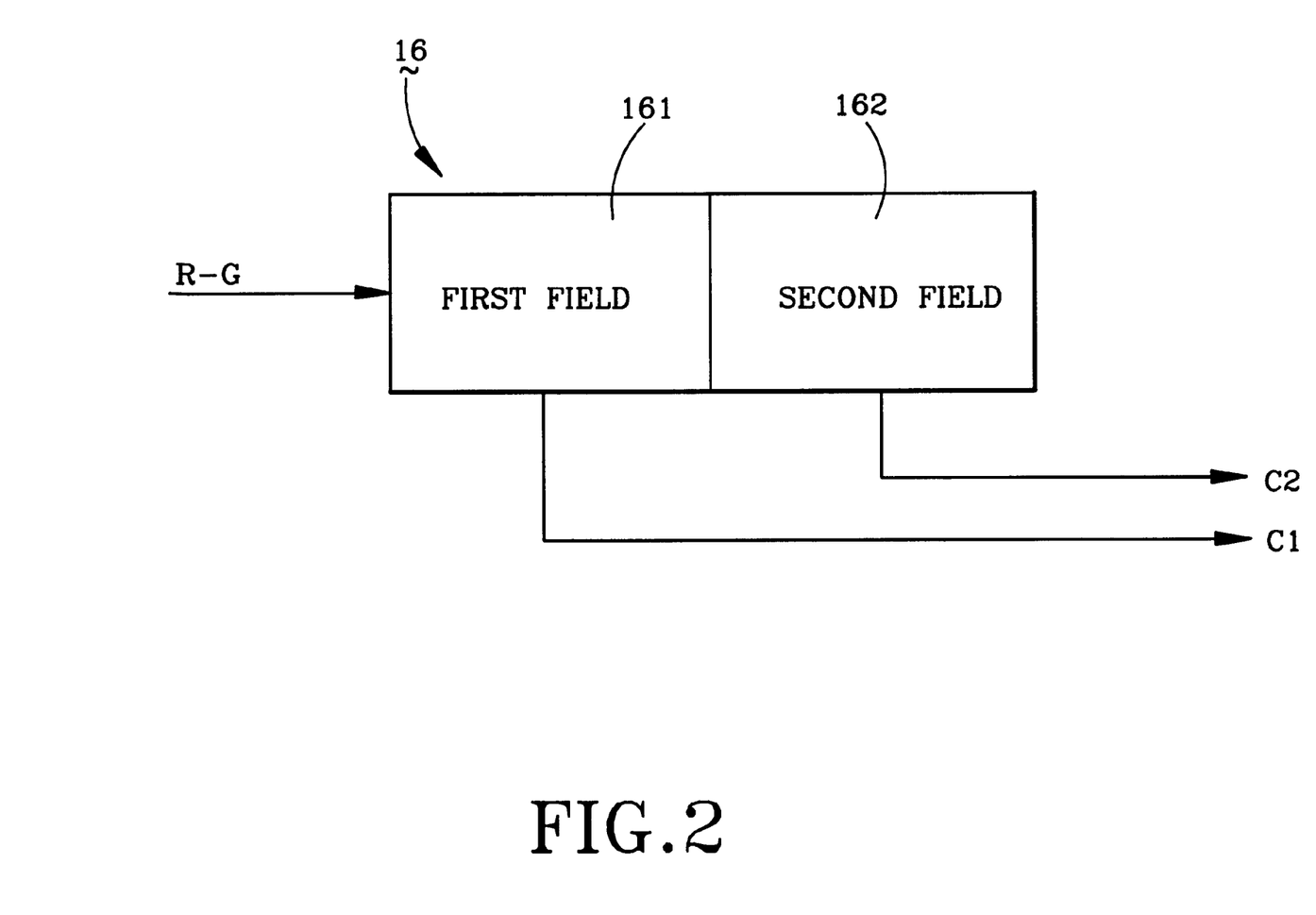
FIG. 2 shows an arrangement of a look-up table unit employed in the first preferred embodiment.

FIG. 2 illustrates an arrangement of the look-up table units employed in the first preferred embodiment. The first look-up table unit 16 is taken as an example in this Figure. As shown, the first look-up table unit 16 includes a first data field 161 which contains the 0.299 (R-G) transformation codes, and a second data field 162 which contains the −0.169(R-G) transformation codes. When the (R-G) color difference signal addresses the first look-up table unit 16, a corresponding codeword that contains a first transformation code from the first data field 161 and a second transformation code from the second data field 162 is outputted via the outputs (C1) and (C2), whereby the first transformation code is provided at the first output (C1) whereas the second transformation code is provided at the second output (C2).

Accordingly, the second look-up table unit 17 includes a first data field which contains the 0.114(B-G) transformation codes, and a second data field which contains the −0.081 (B-G) transformation codes. When the (B-G) color difference signal addresses the second look-up table unit 17, a corresponding codeword that contains a first transformation code from the first data field and a second transformation code from the second data field is outputted via the outputs (C1) and (C2), whereby the first transformation code is provided at the first output (C1) whereas the second transformation code is provided at the second output (C2).

The sizes of the first and second look-up table units 16, 17 of the first preferred embodiment are determined as follows: Since each of the R, G and B color space signals is digitally represented in 8 bits, both the (R-G) and (B-G) color difference signals range from −255 to 255. Therefore, 0.299(R-G) ranges between [−76.2, 76.2] and requires at least 8 bits to represent the same, −0.169(R-G) ranges between [−43.1, 43.1] and requires at least 7 bits to represent the same, 0.114(B-G) ranges between [−29.1, 29.1] and requires at least 6 bits to represent the same, and −0.081(B-G) ranges between [−20.6, 20.6] and requires at least 6 bits to represent the same.

As such, the first look-up table unit 16 requires at least 15 bits to represent a codeword, while the second look-up table unit 17 requires at least 12 bits to represent a codeword. Additional bits may be needed to represent each codeword for precision purposes.

Figure 3:
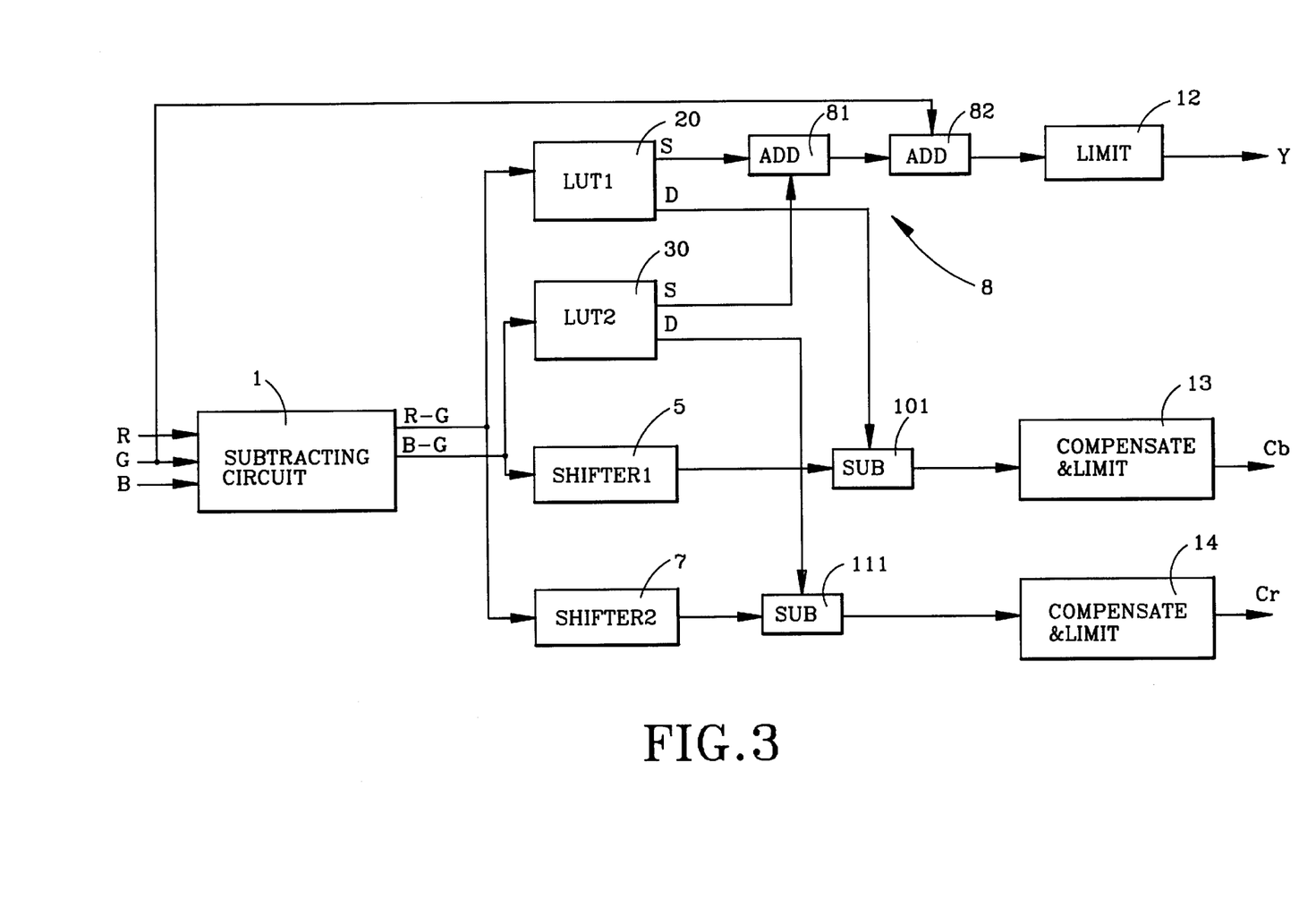
FIG. 3 is a schematic circuit block diagram of the second preferred embodiment of a color space converting apparatus according to the present invention.

Referring to FIG. 3, the second preferred embodiment of a color space converting apparatus for converting digitized RGB color space signals to digitized YCbCr color space signals in accordance with this invention is shown to comprise a subtracting circuit 1, first and second look-up table units 20 and 30, first and second arithmetic right-shift units 5 and 7, first to third combining units 8, 101 and 111, a limit circuit 12, and first and second compensate-and-limit circuits 13 and 14. Unlike the previous embodiment, an average-and-deviation coding method is applied in the first and second look-up table units 20 and 30 to reduce the sizes of the same.

As with the first preferred embodiment, color space conversion is performed according to the following equations:

$$Y = G + 0.299(R-G) + 0.114(B-G) \quad (c.2)$$

$$Cb = 0.5(B-G) - 0.169(R-G) + 128 \quad (d.1)$$

$$Cr = 0.5(R-G) - 0.081(B-G) + 128 \quad (e.1)$$

The subtracting circuit 1 receives the digitized R, G and B color signals and generates (R-G) and (B-G) color difference signals therefrom. The color difference signals are directed to the first and second look-up table units 20 and 30. The first look-up table unit 20 performs the matrix multiplications which are associated with the (R-G) color difference signal, namely 0.299(R-G) and 0.169(R-G). The first look-up table unit 20 has a first output (S) for providing the 0.299(R-G) transformation codes, and a second output (D) for providing the 0.169(R-G) transformation codes. The second look-up table unit 30 performs the matrix multipications which are associated with the (B-G) color difference signal, namely 0.114(B-G) and 0.081(B-G). The second look-up table unit 30 has a first output (S) for providing the 0.114(B-G) transformation codes, and a second output (D) for providing the 0.081(B-G) transformation codes. The first outputs (S) of the first and second look-up table units 20 and 30 correspond to two of the three partial components of the Y color space signal.

The first combining unit 8 comprises a first adder 81 for adding the first outputs (S) of the first and second look-up table units 20 and 30, and a second adder 82 for adding the output of the first adder 81 to the digitized G color space signal. The output of the second adder 82 is clipped by the limit circuit 12 so that the resultant sum is within a range that represents the binary code of the Y color space signal.

The color difference signals are further directed to the first and second arithmetic right-shift units 5 and 7 for performing the matrix multiplications of 0.5(B-G) and 0.5(R-G), respectively. The second output (D) of the first look-up table unit 20 and the output of the first arithmetic right-shift unit 5 correspond to two partial components of the Cb color space signal. The second combining unit 101 includes a subtracter for subtracting the second output (D) of the first look-up table unit 20 from the output of the first arithmetic right-shift unit 5. The first compensate-and-limit circuit 13 compensates the constant value of 128 to the output of the second combining unit 101, and clips the result so as to be within a range that represents the binary code of the Cb color space signal. The second output (D) of the second look-up table unit 30 and the output of the second arithmetic right-shift unit 7 correspond to two partial components of the Cr color space signal. The third combining unit 111 includes a subtracter for subtracting the second output (D) of the second look-up table unit 30 from the output of the second arithmetic right-shift unit 7. The second compensate-and-limit circuit 14 compensates the constant value of 128 to the output of the third combining unit 111, and clips the resultant sum so as to be within a range that represents the binary code of the Cr color space signal.

Figure 4:
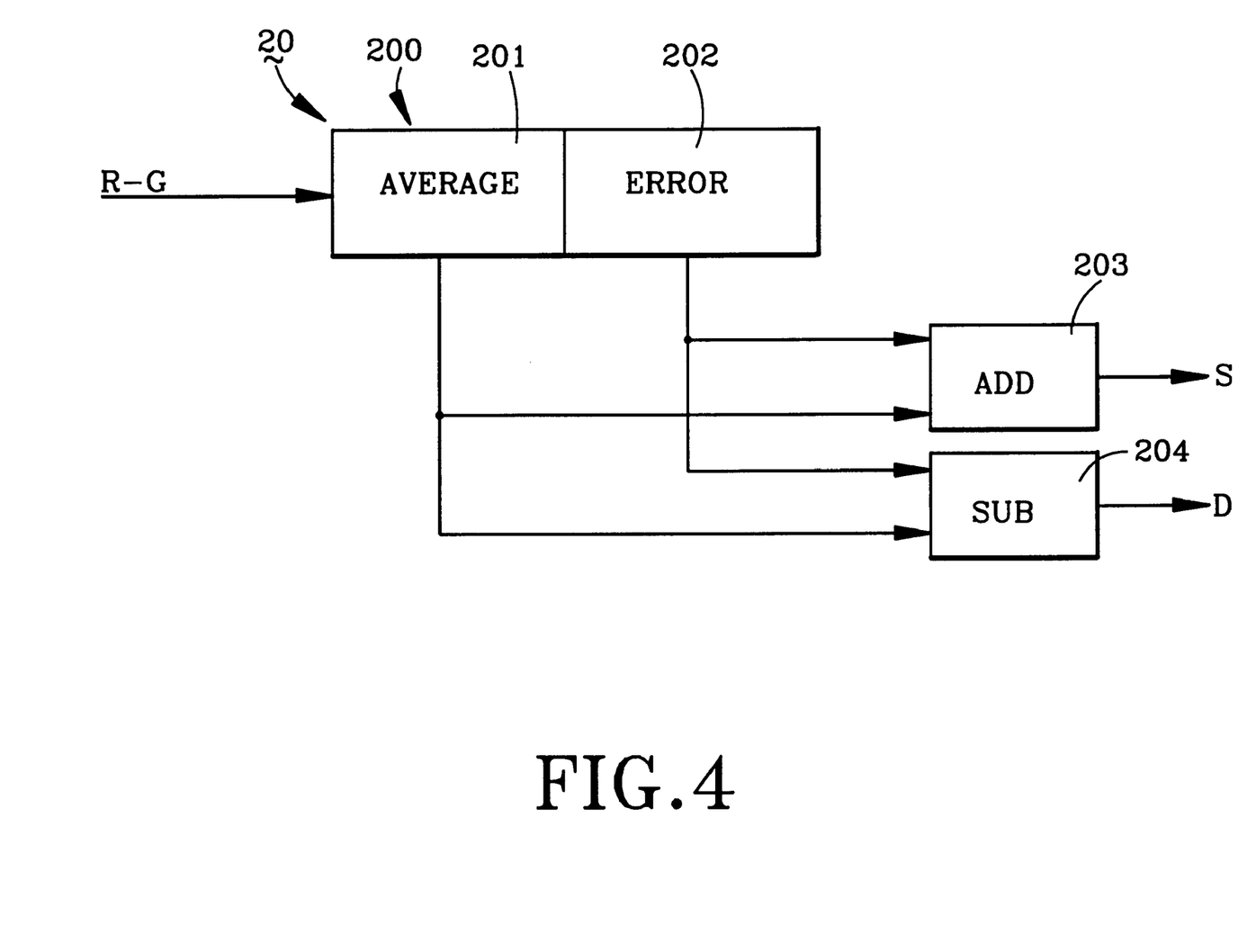
FIG. 4 is a block diagram of a look-up table unit employed in the second preferred embodiment.

FIG. 4 is a block diagram of the look-up table units employed in the second preferred embodiment. The first look-up table unit 20 is taken as an example in this Figure. As shown, the first look-up table unit 20 includes a look-up table portion 200 which has an average data field 201 and an error data field 202. The average data field 201 contains 0.234(R-G) average conversion codes, which are average codes of the desired 0.299(R-G) and 0.169(R-G) transformation codes. The error data field 202 contains 0.065(R-G) error conversion codes, which correspond to the differences between the 0.234(R-G) average conversion codes and corresponding ones of the desired 0.299(R-G) and 0.169(R-G) transformation codes. When the look-up table portion 200 is addressed by the (R-G) color difference signal, an adder 203 of the first look-up table unit 20 adds an average conversion code from the average data field 201 and a corresponding error conversion code from the error data field 202 to provide the 0.299(R-G) transformation code at the first output (S), while a subtracter 204 of the first look-up table unit 20 subtracts the corresponding error conversion code from the average conversion code to provide the 0.169(R-G) transformation code at the second output (D).

For the second look-up table unit 30, the average data field of the look-up table portion thereof contains 0.0975 (B-G) average conversion codes, which are average codes of the desired 0.114(B-G) and 0.081(B-G) transformation codes, while the error data field of the look-up table portion contains 0.0165(B-G) error conversion codes, which correspond to the differences between the 0.0975(B-G) average conversion codes and corresponding ones of the desired 0.114(B-G) and 0.081(B-G) transformation codes. The operation of the second look-up table unit 30 is generally similar to that of the first look-up table unit 20 and will not be detailed further.

The sizes of the look-up table portions of the first and second look-up table units 20, 30 of the second preferred embodiment are determined as follows: As mentioned beforehand, both the (R-G) and (B-G) color difference signals range from −255 to 255. Therefore, 0.234(R-G) ranges between [−59.7, 59.7] and requires at least 7 bits to represent the same, 0.065(R-G) ranges between [−16.6, 16.6] and requires at least 6 bits to represent the same, 0.0975(B-G) ranges between [−24.9, 24.9] and requires at least 6 bits to represent the same, and 0.0165(B-G) ranges between [−4.2, 4.2] and requires at least 4 bits to represent the same.

As such, the first look-up table unit 20 requires at least 13 bits to represent a codeword, while the second look-up table unit 30 requires at least 10 bits to represent a codeword. Thus, the look-up tables of the second preferred embodiment can be reduced as compared to those of the first preferred embodiment.

Figure 5:
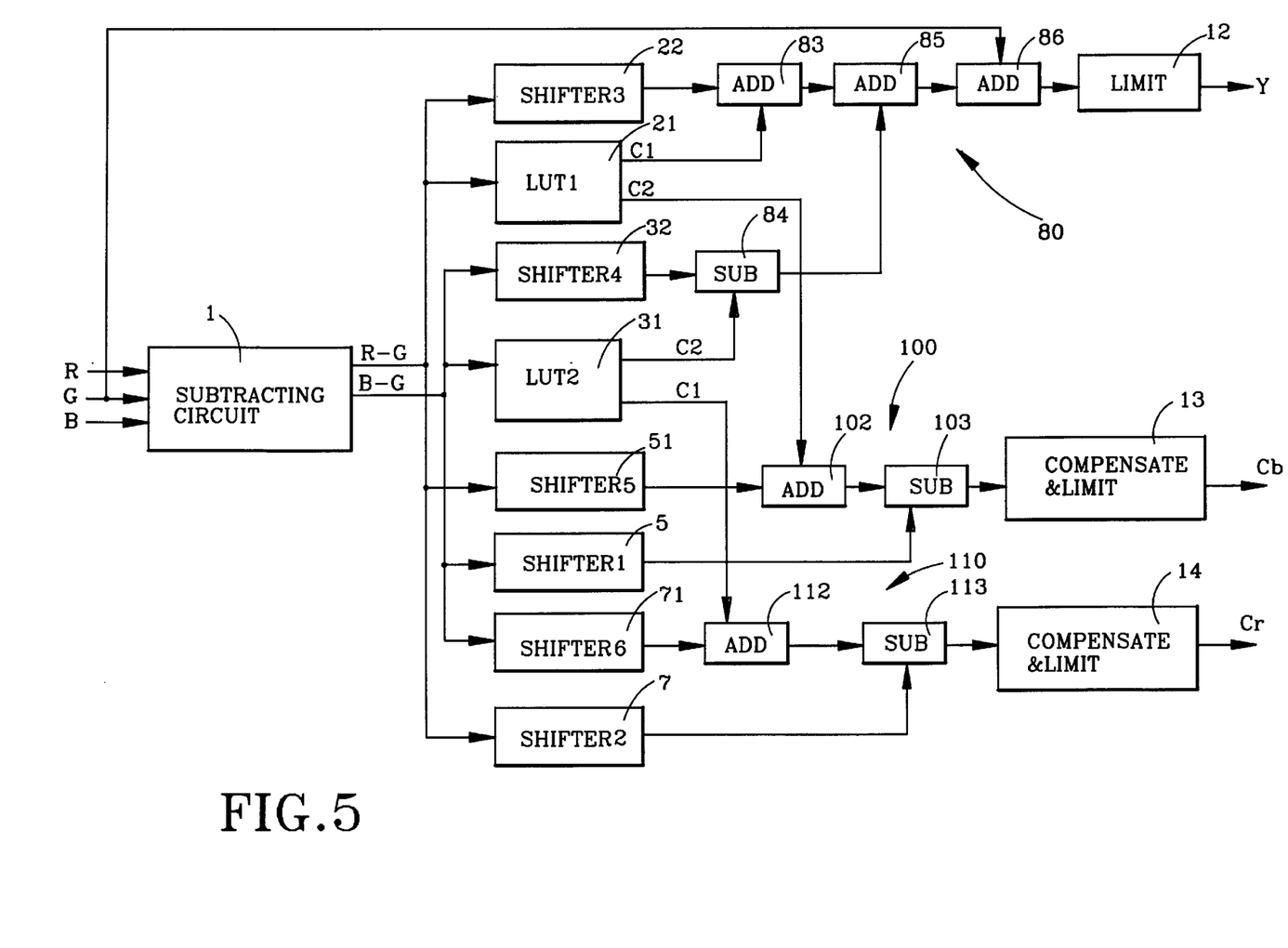
FIG. 5 is a schematic circuit block diagram of the third preferred embodiment of a color space converting apparatus according to the present invention.

FIG. 5 illustrates the third preferred embodiment of a color space converting apparatus for converting digitized RGB color space signals to digitized YCbCr color space signals in accordance with this invention. In this embodiment, equations (c.2), (d.1) and (e.1) are modified by expressing each of the original transformation codes therein as a binary conversion code of the associated color difference signal having a coefficient of a power of ½, and a remainder conversion code as follows:

$$0.299(R\text{-}G) = \frac{1}{2}^2(R\text{-}G) + 0.049(R\text{-}G)$$

$$0.169(R\text{-}G) = \frac{1}{2}^3(R\text{-}G) + 0.044(R\text{-}G)$$

$$0.114(B\text{-}G) = \frac{1}{2}^3(B\text{-}G) - 0.011(B\text{-}G)$$

$$0.081(B\text{-}G) = \frac{1}{2}^4(B\text{-}G) + 0.0185(B\text{-}G)$$

The third preferred embodiment comprises a subtracting circuit 1, first and second look-up table units 21 and 31, first to sixth arithmetic right-shift units 5, 7, 22, 32, 51 and 71, first to third combining units 80, 100 and 110, a limit circuit 12, and first and second compensate-and-limit circuits 13 and 14.

The subtracting circuit 1 receives the R, G and B color signals and generates (R-G) and (B-G) color difference signals therefrom. The color difference signals are directed to the first and second look-up table units 21 and 31. The first look-up table unit 21 performs matrix multiplications which are associated with the (R-G) color difference signal, namely 0.049(R-G) and 0.044(R-G). The second look-up table unit 31 performs matrix multiplications which are associated with the (B-G) color difference signal, namely 0.011(B-G) and 0.0185(B-G).

The first look-up table unit 21 has a first output (C1) for providing the 0.049(R-G) remainder conversion codes, and a second output (C2) for providing the 0.044(R-G) remainder conversion codes. The second lookup table unit 31 has a first output (C1) for providing the 0.0185(B-G) remainder conversion codes, and a second output (C2) for providing the 0.011(B-G) remainder conversion codes. The arrangements of the first and second look-up table units 21, 31 are similar to that shown in FIG. 2 and will not be described further.

The color difference signals are further directed to the arithmetic right-shift units 5, 7, 22, 32, 51 and 71. The first arithmetic right-shift unit 5 provides the 0.5(B-G) binary conversion code. The second arithmetic right-shift unit 7 provides the 0.5(R-G) binary conversion code. The third arithmetic right-shift unit 22 provides the ½² (R-G) binary conversion code, which requires a two-bit shifting of the (R-G) color difference signal. The fourth arithmetic right-shift unit 32 provides the ½³ (B-G) binary conversion code, which requires a three-bit shifting of the (B-G) color difference signal. The fifth arithmetic right-shift unit 51 provides the ½³ (R-G) binary conversion code, which requires a three-bit shifting of the (R-G) color difference signal. The sixth arithmetic right-shift unit 71 provides the ½⁴ (B-G) binary conversion code, which requires a four-bit shifting of the (B-G) color difference signal.

The first combining unit 80 comprises an adder 83 for adding the output of the third arithmetic right-shift unit 22 and the first output (C1) of the first look-up table unit 21 to obtain the original 0.299(R-G) transformation code, a subtracter 84 for subtracting the second output (C2) of the second look-up table unit 31 from the output of the fourth arithmetic right-shift unit 32 to obtain the original 0.114(B-G) transformation code, an adder 85 for adding the outputs of the adder 83 and the subtracter 84, and an adder 86 for adding the output of the adder 85 to the digitized G color space signal. The output of the adder 86 is clipped by the limit circuit 12 so that the resulting output is within a range that represents the binary code of the Y color space signal.

The second combining unit 100 comprises an adder 102 for adding the output of the fifth arithmetic right-shift unit 51 and the second output (C2) of the first look-up table unit 21 to obtain the original 0.169(R-G) transformation code, and a subtracter 103 for subtracting the output of the adder 102 from the output of the first arithmetic right-shift unit 5. The first compensate-and-limit circuit 13 compensates the constant value of 128 to the output of the subtracter 103, and clips the result so as to be within a range that represents the binary code of the Cb color space signal.

The third combining unit 110 comprises an adder 112 for adding the output of the sixth arithmetic right-shift unit 71 and the first output (C1) of the second look-up table unit 31 to obtain the original 0.081(B-G) transformation code, and a subtracter 113 for subtracting the output of the adder 112 from the output of the second arithmetic right-shift unit 7. The second compensate-and-limit circuit 14 compensates the constant value of 128 to the output of the subtracter 113, and clips the result so as to be within a range that represents the binary code of the Cr color space signal.

The sizes of the first and second look-up table units 21, 31 of the third preferred embodiment are determined as follows: As mentioned beforehand, both the (R-G) and (B-G) color difference signals range from −255 to 255. Therefore, 0.049(R-G) ranges between [−12.5, 12.5] and requires at least 5 bits to represent the same, 0.044(R-G) ranges between [−11.2, 11.2] and requires at least 5 bits to represent the same, 0.011(B-G) ranges between [−2.8, 2.8] and requires at least 3 bits to represent the same, and 0.0185(B-G) ranges between [−4.7, 4.7] and requires at least 4 bits to represent the same.

As such, the first look-up table unit 21 requires at least 10 bits to represent a codeword, while the second look-up table unit 31 requires at least 7 bits to represent a codeword. Thus, by expressing each of the original transformation codes of the equations (c.1) to (c.3), (d.1) to (d.4) and (e.1) to (e.4) as a binary conversion code of the associated color difference signal having a coefficient of a power of ½, and a relatively small remainder conversion code, the sizes of the look-up table units 21, 31 of the third preferred embodiment can be further reduced as compared to those of the previous embodiments.

In the fourth preferred embodiment of the present invention, the average-and-deviation coding method of the second preferred embodiment is applied to the first and second look-up table units of the third preferred embodiment to further reduce the sizes of the same. As such, each of the first and second look-up table units of the fourth preferred embodiment will have a block diagram similar to that shown in FIG. 4. The first look-up table unit of the fourth preferred embodiment includes a look-up table portion which has an average data field and an error data field. The average data field contains 0.0465(R-G) average conversion codes, which are average codes of the desired 0.049(R-G) and 0.044(R-G) remainder conversion codes. The error data field contains 0.0025(R-G) error conversion codes, which correspond to the differences between the 0.0465(R-G) average conversion codes and corresponding ones of the desired 0.049(R-G) and 0.044(R-G) remainder conversion codes. When the look-up table portion of the first look-up table unit of the fourth preferred embodiment is addressed by the (R-G) color difference signal, an adder of the first look-up table unit adds an average conversion code from the average data field and a corresponding error conversion code from the error data field to provide the 0.049(R-G) remainder conversion code at the first output of the first lookup table unit, while a subtracter of the first look-up table unit subtracts the corresponding error conversion code from the average conversion code to provide the 0.044(R-G) remainder conversion code at the second output of the first look-up table unit.

For the second look-up table unit of the fourth preferred embodiment, the average data field of the look-up table portion thereof contains 0.01475(B-G) average conversion codes, which are average codes of the desired 0.011(B-G) and 0.0185(B-G) remainder conversion codes, while the error data field of the look-up table portion contains 0.00375(B-G) error conversion codes, which correspond to the differences between the 0.01475(B-G) average conversion codes and corresponding ones of the desired 0.011(B-G) and 0.0185(B-G) remainder conversion codes. The operation of the second look-up table unit of the fourth preferred embodiment is generally similar to that of the first look-up table unit and will not be detailed further.

Except for the arrangement of the first and second look-up table units, the structure and operation of the fourth preferred embodiment are generally similar to those of the third preferred embodiment. As such, a detailed description of the same will be abbreviated herein.

The sizes of the look-up table portions of the first and second look-up table units of the fourth preferred embodiment are determined as follows: Like the previous embodiments, both the (R-G) and (B-G) color difference signals range from −255 to 255. Therefore, 0.0465(R-G) ranges between [−11.9, 11.9] and requires at least 5 bits to represent the same, 0.0025(R-G) ranges between [−0.6, 0.6] and requires at least 2 bits to represent the same, 0.01475(B-G) ranges between [−3.8, 3.8] and requires at least 4 bits to represent the same, and 0.00375(B-G) ranges between [−0.9, 0.9] and requires at least 2 bits to represent the same.

As such, the first look-up table unit requires at least 7 bits to represent a codeword, while the second look-up table unit requires at least 6 bits to represent a codeword. The minimum sizes of the look-up table units of the fourth preferred embodiment are thus the smallest among those of the preceding embodiments.

It should be noted that, although the preferred embodiments are shown as hard-wired blocks in a dedicated hardware circuitry, the present invention may be easily and efficiently implemented by a programmed microcomputer using a microprocessor and the associated system memory to perform the calculation of the conversion.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for converting digitized RGB color space signals to digitized YCbCr color space signals, comprising the steps of:

generating at least two color difference signals, each being in terms of any two of the digitized RGB color space signals; and performing first, second, third and fourth matrix multiplication operations of the color difference signals, the first and second matrix multiplication operations having first and second results to be used in conversion for the digitized Y color space signal, the third matrix multiplication operation having a third result to be used in conversion for the digitized Cb color space signal, the fourth matrix multiplication operation having a fourth result to be used in conversion for the digitized Cr color space signal;

wherein one of the first and second matrix multiplication operations and one of the third and fourth matrix multiplication operations are associated with the same one of the color difference signals and are jointly implemented in a single look-up table unit.

2. The method of claim 1, wherein the look-up table unit has first and second outputs, and outputs a corresponding codeword that contains a first transformation code corresponding to the results of said one of the first and second matrix multiplication operations at the first output, and a second transformation code corresponding to the results of said one of the third and fourth matrix multiplication operations at the second output when the look-up table unit is addressed by the same one of the color difference signals.

3. The method of claim 2, wherein the look-up table unit includes a first data field which contains the first transformation codes, and a second data field which contains the second transformation codes.

4. The method of claim 2, wherein the look-up table unit includes:

a look-up table portion which has an average data field and an error data field, the average data field containing average conversion codes which are average codes of the first and second transformation codes, the error data field containing error conversion codes which correspond to differences between the average conversion codes and corresponding ones of the first and second transformation codes, the look-up table portion outputting one of the average conversion codes and the corresponding one of the error conversion codes when addressed by the same one of the color difference signals;

first combining means for combining an outputted one of the average conversion codes and the corresponding one of the error conversion codes in a first manner to generate the corresponding one of the first transformation codes at the first output; and second combining means for combining the outputted one of the average conversion codes and the corresponding one of the error conversion codes in a second manner to generate the corresponding one of the second transformation codes at the second output.

5. The method of claim 4, wherein the first combining means includes an adder, and the second combining means includes a subtracter.

6. The method of claim 2, further comprising the steps of:

performing arithmetic right-shift operations of the color difference signals to obtain a plurality of binary conversion codes of the color difference signals having coefficients of powers of ½;

combining a first set of the binary conversion codes, the first and second results of the first and second matrix multiplication operations, and one of the digitized RGB color space signals to obtain a resultant sum, and clipping the resultant sum to between a range that represents binary code of the Y color space signal;

combining a second set of the binary conversion codes, the third result of the third matrix multiplication operation, and a first constant to obtain a first compensated result, and clipping the first compensated result to between a range that represents binary code of the Cb color space signal; and combining a third set of the binary conversion codes, the fourth result of the fourth matrix multiplication operation, and a second constant to obtain a second compensated result, and clipping the second compensated result to between a range that represents binary code of the Cr color space signal.

7. The method of claim 1, further comprising the steps of:

combining the first and second results of the first and second matrix multiplication operations and one of the digitized RGB color space signals to obtain a resultant sum; and clipping the resultant sum to between a range that represents binary code of the Y color space signal.

8. The method of claim 1, further comprising the steps of:

performing arithmetic right-shift operation of one of the color difference signals to obtain a fifth result;

combining a corresponding one of the third and fourth results of the third and fourth matrix multiplication operations and the fifth result of the arithmetic right-shift operation to obtain a resultant sum;

compensating a constant to the resultant sum to obtain a compensated result; and clipping the compensated result to between a range that represents binary code of a corresponding one of the Cb and Cr color space signals.

9. An apparatus for converting digitized RGB color space signals to digitized YCbCr color space signals, comprising:

means for generating at least two color difference signals, each being in terms of any two of the digitized RGB color space signals; and means for performing first, second, third and fourth matrix multiplication operations of the color difference signals, said first and second matrix multiplication operation performing means having first and second results to be used in conversion for the digitized Y color space signal, said third matrix multiplication operation performing means having a third result to be used in conversion for the digitized Cb color space signal, said fourth matrix multiplication operation performing means having a fourth result to be used in conversion for the digitized Cr color space signal;

wherein one of the first and second matrix multiplication operations performed by one of said first and second matrix multiplication operation performing means, and one of the third and fourth matrix multiplication operations performed by one of said third and fourth matrix multiplication operation performing means are associated with the same one of the color difference signals, said one of said first and second matrix multiplication operation performing means and said one of said third and fourth matrix multiplication operation performing means being jointly implemented in a single look-up table unit.

10. The apparatus of claim 9, wherein said look-up table unit has first and second outputs, and outputs a corresponding codeword that contains a first transformation code corresponding to the results of said one of said first and second matrix multiplication operation performing means at said first output, and a second transformation code corresponding to the results of said one of said third and fourth matrix multiplication operation performing means at said second output when said look-up table unit is addressed by said same one of the color difference signals.

11. The apparatus of claim 10, wherein said look-up table unit includes a first data field which contains the first transformation codes, and a second data field which contains the second transformation codes.

12. The apparatus of claim 10, wherein said look-up table unit includes:

a look-up table portion which has an average data field and an error data field, said average data field containing average conversion codes which are average codes of the first and second transformation codes, said error data field containing error conversion codes which correspond to differences between the average conversion codes and corresponding ones of the first and second transformation codes, said look-up table portion outputting one of the average conversion codes and the corresponding one of the error conversion codes when addressed by said same one of the color difference signals;

first combining means for combining an outputted one of the average conversion codes and the corresponding one of the error conversion codes in a first manner to generate the corresponding one of the first transformation codes at said first output; and second combining means for combining the outputted one of the average conversion codes and the corresponding one of the error conversion codes in a second manner to generate the corresponding one of the second transformation codes at said second output.

13. The apparatus of claim 12, wherein said first combining means includes an adder, and said second combining means includes a subtracter.

14. The apparatus of claim 10, further comprising:

means for performing arithmetic right-shift operations of the color difference signals to obtain a plurality of binary conversion codes of the color difference signals having coefficients of powers of ½;

means for combining a first set of the binary conversion codes, the first and second results of said first and second matrix multiplication operation performing means, and one of the digitized RGB color space signals to obtain a resultant sum, and for clipping the resultant sum to between a range that represents binary code of the Y color space signal;

means for combining a second set of the binary conversion codes, the third result of said third matrix multiplication operation performing means, and a first constant to obtain a first compensated result, and for clipping the first compensated result to between a range that represents binary code of the Cb color space signal; and means for combining a third set of the binary conversion codes, the fourth result of said fourth matrix multiplication operation performing means, and a second constant to obtain a second compensated result, and for clipping the second compensated result to between a range that represents binary code of the Cr color space signal.

15. The apparatus of claim 9, further comprising:

means for combining the first and second results of said first and second matrix multiplication operation performing means and one of the digitized RGB color space signals to obtain a resultant sum; and means for clipping the resultant sum to between a range that represents binary code of the Y color space signal.

16. The apparatus of claim 9, further comprising:

means for performing arithmetic right-shift operation of one of the color difference signals to obtain a fifth result;

means for combining a corresponding one of the third and fourth results of said third and fourth matrix multiplication operation performing means and the fifth result of said arithmetic right-shift operation performing means to obtain a resultant sum;

means for compensating a constant to the resultant sum to obtain a compensated result; and means for clipping the compensated result to between a range that represents binary code of a corresponding one of the Cb and Cr color space signals.

\* \* \* \* \*